Figure 1:
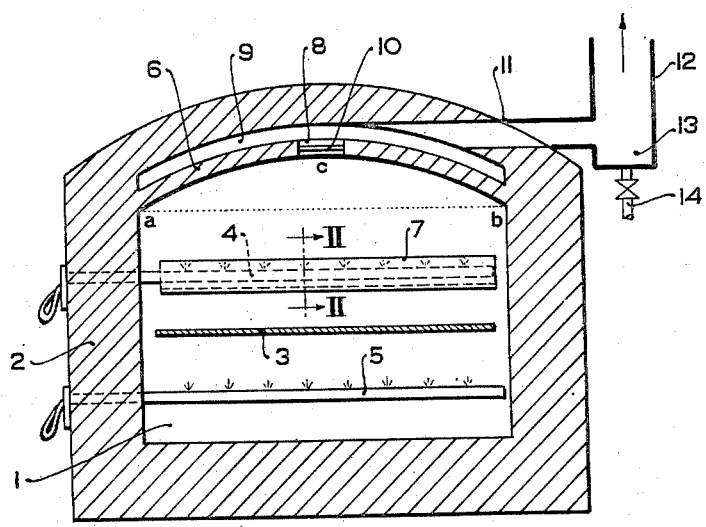

Dec. 26, 1950 T. R. NEUTELINGS ET AL 2,535,650
BAKING OVEN
Filed Nov. 16, 1946

Inventors:
Theodoor R. Neutelings
and Willem Neutelings

Patented Dec. 26, 1950

2,535,650

UNITED STATES PATENT OFFICE 2,535,650

BAKING OVEN

Theodoor R. Neutelings and Willem Neutelings, Bergen op Zoom, Netherlands, assignors to Industrie-en Handelmaatschappij "De Vuurslag" C. V., Bergen op Zoom, Netherlands, a company of the Netherlands Application November 16, 1946, Serial No. 710,341
In the Netherlands May 7, 1942

Section 1, Public Law 690, August 8, 1946
Patent expires May 7, 1962

2 Claims. (Cl. 107—55)

This invention relates to an oven for baking articles of food, such as bread, biscuits, pastry, cake and the like.

In the usual continuously operating ovens for this purpose, the baking room is formed as a horizontal tunnel through which the articles to be baked are carried by means of a conveyor, which may consist alternatively of endless chains, a band of steel or a band of wire-mesh.

When ovens of this kind are provided with direct heating, the heating elements, for instance gas burners, are generally arranged in the baking room, at least above the conveyor and distributed at uniform distances over the whole width of the baking room.

With relation to ovens with indirect heating, in which the heating elements are placed in a separate room, adjacent the baking room but independent thereof, ovens with direct heating present the advantage that they have a more favourable thermal efficiency, as with the indirectly heating system, heat is lost in the independent heating room and during the transmission of heat towards the baking room separated from the heating room as well during the preheating step of the oven as for maintaining the temperature in the baking room.

As with the direct heating system, the heating elements are arranged inside the baking room, it is possible to more rapidly and accurately regulate the temperature in said room than with indirectly heated ovens. This is of so much the more importance by the necessity of rapidly increasing or lowering the temperature locally in the oven, which may be carried out more rapidly, efficiently and more economically in such ovens, which are generally a hundred feet in length and preferably have to be adapted to operate with different starting, intermediate and final temperatures, than in indirectly heated ovens.

Against these advantages of directly heated ovens they however have drawbacks, namely in the first place, the inconvenience that the baking room and thus also the conveyor and the goods to be baked are not uniformly heated, which has an influence on the color, taste and the crust-formation of the product.

This unfavourable intense local heating mainly results from the directly radiated heat of the heating elements on the goods to be baked, so that the latter are temporarily absorbing too much heat in the neighbourhood of a heating element and are exposed thereby to a detrimental high temperature.

A further disadvantage of the direct heating system resides in the fact that when gas burners are used as heating elements, the burners are hindered by the rising vapor which the bakery goods emanate in great quantities. This trouble can be so acute that the burner is extinguished or burns with a very irregular flame. This drawback is furthered in a considerable measure by the ammonia and carbonic acid gases which by heating the bakery goods are generated from the chemical rising substances used in the biscuits, pastry and the like.

The invention has for its object to eliminate the above mentioned drawbacks of the directly heated ovens while maintaining the advantages thereof. According to the invention the top wall of the baking room is vaulted in transverse direction and the burners or like heating elements are arranged and constructed in such a manner that they cannot exert a direct radiation of heat upon the bakery goods. With this embodiment of the oven, substantially all the heat will be uniformly radiated and reflected on the bakery goods by the top wall of the baking room over the whole width of the oven.

When gas burners are used as heating elements, the aforesaid effect of the vaulted top wall of the baking room may be furthered by arranging the burners located above the conveyor, with the gas outlets in upward direction and to surround them at the underside by a gutter. Such gutter preferably consists of material having a bad heat conductivity, and prevents not only the direct radiation on the bakery goods, but also protects the burner against the action of the vapor and ammonia and carbonic acid gases generated by the bakery goods and which are emanated from the chemical leavening substances, such as carbonate of ammonia, sodium bicarbonate, and the like. Corrosion of the metal parts of the burner by the combined action of the vapor and the generated gases is also restricted thereby as much as possible.

Figure 2:
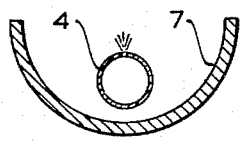

In the accompanying drawing an embodiment of the oven according to the invention has been diagrammatically illustrated. Fig. 1 is a cross section of the oven and Figure 2 is a section on a larger scale of the burner, along the line II—II of Figure 1.

The baking room 1 is surrounded by a wall 2 composed of heat insulating material. The goods to be baked are carried through the oven by a continuously running conveyor 3, and the burners 4, 5 are arranged above and below the conveyor, the burners 4 having also their flames in upward direction.

The top wall 6 of the baking room 1 is formed by a vault, the surface a—c—b of which is so curved that the heat rays reflected by said surface are mainly concentrated upon the conveyor.

The burner 4 is surrounded at the underside by a gutter 7, which preferably consists of a material resistant against heat and of low heat conductivity, so as to prevent direct radiation from the flames upon the bakery goods as the heat rays must first be reflected against the vault 6. In consequence of the low conductivity of the gutter 7, the radiation of the heat accumulated therein will be as small as possible and will be dispersed owing to the circular shape of the gutter.

As is particularly shown in Figure 2, the sidewalls of the gutter 7 extend to a level with or somewhat above the tops of the flames of the burner, so that the gases and vapors generated from the bakery goods and flowing to the discharge opening cannot disturb the combustion.

The burners 5 which are arranged below the conveyor, are situated at such a distance therefrom that the flames cannot damage said conveyor so as to prevent overheating and rusting thereof. The combustion gases of these burners may ascend through gaps at the side-edges of the conveyor and accumulate in the space under the vault. The gases and vapors accumulated in said space escape through ports 8 into the channel 9 provided in the vault and extending over the whole length and width of the oven. In the discharge ports 8 slides or valves 10 are provided, which are adjustable from the outside.

The discharge channel 9 communicates through a pipe 11 with a chimney 12. As said discharge channel is completely insulated, nearly the same temperature will reign therein as in the baking room itself, so that in said channel no condensation will occur and the reflux of condensate towards the oven will be prevented. The condensate eventually formed in the chimney accumulates in the steam trap 13 and may from time to time be withdrawn through the drain cock 14.

What we claim is:

1. A baking oven comprising in combination a baking chamber formed as a generally horizontal tunnel, a conveyor passing through said tunnel in longitudinal direction thereof, a series of gas burners extending in transverse direction within said tunnel above said conveyor and having their outlet holes directed toward the top wall of the tunnel, and trough-like shields disposed at the underside of said burners and having their lateral walls reaching above the plane of the outlet holes of the burners.

2. A baking oven comprising in combination a baking chamber formed as a generally horizontal tunnel and having a top wall vaulted in transverse direction, a conveyor passing through said tunnel in longitudinal direction thereof, a series of gas burners extending in transverse direction within said tunnel above said conveyor and having their outlet holes directed toward the vaulted top wall of the tunnel, and trough-like shields disposed at the underside of said burners and having their lateral walls reaching above the plane of the outlet holes of the burners.

THEODOOR R. NEUTELINGS.
WILLEM NEUTELINGS.

REFERENCES CITED

The following references are of record in the file of this patent:

UNITED STATES PATENTS

| Number | Name | Date |
|---|---|---|
| 838,270 | Peters | Dec. 11, 1906 |
| 1,206,118 | Larraburu | Nov. 28, 1916 |
| 1,496,844 | Dredge | June 10, 1924 |
| 1,637,659 | Sacerdote | Aug. 2, 1927 |
| 1,663,116 | Comstock | Mar. 20, 1928 |
| 1,796,134 | Worner | Mar. 10, 1931 |
| 1,948,440 | Crosland | Feb. 20, 1934 |
| 2,146,429 | Hawkins | Feb. 7, 1939 |

FOREIGN PATENTS

| Number | Country | Date |
|---|---|---|
| 590,727 | Germany | Jan. 9, 1934 |